UNITED STATES PATENT OFFICE.

WILLIAM L. FRAZIER, OF BOISE, IDAHO.

DIABETES REMEDY.

1,384,445.   Specification of Letters Patent.   Patented July 12, 1921.

No Drawing. Original application filed January 15, 1921, Serial No. 437,585. Divided and this application filed June 6, 1921. Serial No. 475,352.

*To all whom it may concern:*

Be it known that I, WILLIAM L. FRAZIER, a citizen of the United States, residing at Boise, in the county of Ada and State of Idaho, have invented certain new and useful Improvements in Diabetes Remedies; and I do hereby declare the following to be a full, clear, and exact description of the invention, such as will enable others skilled in the art to which it appertains to make and use the same.

As stated in my application for diabetes remedies, filed January 15, 1921, Serial No. 437,585, of which this application is a division, the cause of diabetes as generally accepted by the medical profession has been that of a pancreatic lesion; it is upon this that the treatment of diabetes has been founded. This is an unstable foundation and a false premise to build on; it is so, because all individuals affected with diabetes do not have pancreatic lesions, and also the pancreatic lesions appear in individuals who do not have diabetes.

All pathologists admit that the pancreatic lesion is not always present, for instance Opie in his second edition on the *Diseases of the Pancreas*, page 318 states:—"On the one hand, all cases of diabetes are not accompanied by demonstratable lesions of the pancreas, and on the other hand, all lesions of the pancreas are not associated with diabetes." This is not the finding of Opie only, but it is also the finding of every pathologist.

It is self evident that a disease cannot exist because of a certain lesion, when that certain lesion does not exist. Therefore diabetes can not be dependent upon a pancreatic lesion, because a pancreatic lesion does not exist in every case of diabetes; this being true diabetes must be dependent upon some other condition.

The foundation of the present theory of the cause of diabetes being thus destroyed, we are compelled to look further for the cause.

Diabetes is so named because of one symptom that is so prominent in diabetic individuals: This symptom is glycosuria, though it is not continuously present in every diabetic. Also this symptom is present at periods in individuals suffering from other infections, such as those occurring in the apex of the teeth, etc.: If glycosuria can be caused by infection, then it is possible for there to exist an infection which is responsible for glycosuria in the individual known as a diabetic, even though this symptom may at intervals be absent or even late in appearing.

If diabetes is due to a certain infection, it is necessarily due in each case to the same cause, and this cause must be demonstratable in each case.

If the cause is an infectious organism, it must conform to certain rules; these rules have been pointed out by Koch and are in substance as follows:—

1st. The organism must be isolated in pure culture.

2nd. In cases of disease caused by infection, the same organism must be isolated in every case.

3rd. Must be able to produce the disease, by inoculating an animal with the isolated organism.

4th. The organism must be recovered from the inoculated animal.

On the other hand the reverse is true, if a certain organism can be isolated in pure culture, in each case of a certain disease and that certain organism introduced into an animal producing the same disease, and is isolated in pure culture from the animal in which the disease has been produced, then that organism is the cause of the disease.

I claim that I have isolated a certain and definite organism in pure culture, in each and every case of diabetes which I have examined for this said organism, and that the number has been sixty-one.

And that the same organism exists in the same individuals displaying many of the ordinary symptoms of diabetes with a constant, periodic, or delayed glycosuria. That I have produced the same disease in a guinea-pig by inoculating it with the organism isolated from a diabetic individual, and that this same organism has been isolated from the guinea-pig in pure culture while it was affected with the disease.

Therefore I claim that the organism that produces diabetes is the organism that I have isolated from every case of diabetes examined, and with which I produced diabetes in the guinea-pig, from which guinea-pig the organism was again recovered.

Having by the above laws established that a certain organism is the causative agent in diabetes, an improved treatment of same is brought about by following the law of Wright, namely:—

A protective or curative serum may be produced from an organism by injecting a killed or attenuated organism, or its excreta, or both the organism and the excreta into an animal producing in the animal injected, antibodies and anti-toxins against the infection.

This law of Wright is not applicable in the treatment of diabetes, except in the usage of the organism which I have discovered in and isolated from the diabetic, and it is by this discovery and isolation that I have prepared a serum used as an improved and curative agent in diabetes.

The method of isolation which I have successfully employed is direct culture from the patient's blood preferably in dextrose broth or bouillon, usually requiring an incubation period of from three days to two weeks, at a temperature of thirty-seven degrees centigrade.

The organism may be identified as a bacillus, approximately three to seven microns long and one to two microns in width. It is an aerobe, growing equally well on plain agar, potato agar, or egg agar, possibly more prolific on gelatin agar, without characteristic size, shape, or color of colonies. It is non-motile, sporulates, and grows singly or in clumps. It is acid forming, stains readily with Romanowsski's methylene blue, carbol-fuschine and Wright's stain, probably most clearly with Wright's: It is gram-positive.

For the treatment of diabetes mellitus, or for immunizing individuals against said disease, I have prepared the following:—

A medical preparation for the treatment of diabetes mellitus, comprising a blood serum of an animal treated with organisms causative of the said disease to produce antibodies antagonistic to the toxins and organism causative of diabetes mellitus.

This product may be produced by any standard method, practice or technique relating to the production of blood serums and toxins, or by approved modifications of same.

To produce, inject the killed, attenuated, or live organism and their excreta cultured from a diabetic individual into an animal from which the serum is desired: The resistance of the injected animal is raised against this organism by the production of anti-bodies and anti-toxins against said organism.

When the animal's blood is sufficiently charged with the anti-bodies and anti-toxins, a portion of the blood is drawn and the serum contents of the drawn blood is separated for use as a blood serum as before indicated.

The blood serum acts directly upon the diabetic organism in the individual under treatment to destroy said organism and its toxins.

The reason why a blood serum is more advantageous in the treatment of diabetes mellitus than the former accepted method of the medical profession is because the blood serum is loaded with anti-bodies active against the offending organism of diabetes mellitus and the anti-toxins active in neutralizing the toxins of the diabetes mellitus organism, thereby relieving the condition by destroying the cause.

The animals employed in the preparation of the above described blood serum are the horse, sheep and goat, or any other animal usually employed for the purpose of making serums. These particular animals are selected for the reason that they are most easily domesticated and handled, and also because so large an amount of blood can be obtained.

The guinea-pig or the rabbit or other animals could be used as successfully, but the amount of serum obtained would be small.

Having thus described my invention, what I claim as new and desire to secure by Letters Patent of the United States is:

A medical preparation for the treatment of diabetes mellitus comprising the blood serum of an animal treated with organisms causative of the said disease, to produce anti-bodies antagonistic to the toxins and organisms causative of diabetes mellitus.

In testimony whereof I affix my signature.

WILLIAM L. FRAZIER.